United States Patent Office

3,153,680
Patented Oct. 20, 1964

3,153,680
POLY-ALPHA-OLEFIN COMPOSITIONS HAVING IMPROVED DYE AFFINITY
Piero Giustiniani, Giulio Natta, and Giorgio Mazzanti, Milan, and Giovanni Crespi, Busto Arsizio, Italy, assignors to Montecatini Società Generale per l'Industria Mineraria e Chimica, Milan, Italy, a corporation of Italy
No Drawing. Filed Aug. 1, 1960, Ser. No. 46,344
Claims priority, application Italy Aug. 3, 1959
19 Claims. (Cl. 260—874)

The present invention relates to polymeric compositions having an improved affinity for dyes, such compositions made of a polymer of a poly-alpha-olefin and a polymer obtained by polymerization of at least one monomer having polar groups containing at least one oxygen atom.

Heretofore, it has been known that certain synthetic linear crystalline polymers obtained from hydrocarbon monomers and having a melting point between about 150° and 300° C. can be used for the production of textile fibres. Certain crystalline polymers of vinyl hydrocarbons (e.g. isotactic polypropylene) have offered considerable advantages in the production of fibres, particularly as regards mechanical properties and lightness. However, such crystalline polymers have not been satisfactory because of their poor affinity for dyes, this poor affinity being due to the particular chemical nature of such polyolefinic hydrocarbons.

Many processes have been proposed in order to improve the affinity of such polyolefinic hydrocarbons for dyes, such as the addition of suitable solid substances soluble in the molten polyolefin to the polyolefin before spinning. The addition of e.g., basic substances facilitates dyeing with acid dyes; similarly the addition of acid substances favors dyeing with basic dyes.

However, such processes have not been completely satisfactory, for not all of the added substances remain dissolved in the polyolefin, and when such substances solidify and crystallize, they separate out in a non-uniform manner, thereby reducing the mechanical strength of the filaments. Moreover, substances which, although soluble in the molten polyolefin, are not soluble in the cooled solid polyolefin, cause formation of a separate phase from that of the mechanically resistant fibre, so that such substances are easily removed during wet washing with surface-active substances or during dry cleaning with organic solvents.

It has also been proposed to increase the affinity of dyes for polyolefin fibres by grading polymeric chains onto the polyolefin chains, or by subjecting the fibres to a preliminary peroxidation, or by subjecting the fibres to high energy radiation, which results in the formation of free radicals. When such processes are applied to the polyolefin after it is in filamentary form, the surface properties of the fibres are considerably modified and the dye receptivity is improved. However, when such processes are applied to highly crystalline filaments, any grafting onto the preformed fibers takes place primarily only at the surface. Therefore, subsequent dyeing is limited to the surface portion of the fibre and does not penetrate inside the fibre.

It is an object of this invention to provide a polymeric composition having improved affinity for dyes.

Additional objects will become apparent hereinafter.

Surprisingly, we have found that linear polymers of monomers having polar groups containing at least one oxygen atom, these polymers having a regular structure, can be dissolved in molten polyolefins, e.g., in isotactic polypropylene. Thus, polymeric compositions are obtained consisting of (1) a linear poly-alpha-olefin and (2) at least one linear high molecular weight polymer having regular structure, this polymer being soluble in the linear poly-alpha-olefin when the poly-alpha-olefin in the molten state, this linear polymer having regular structure being obtained by polymerization of a monomer having at least one polar group containing at least one oxygen atom. The polymeric compositions thus obtained present a much higher affinity for dyes than do the normal poly-alpha-olefins.

From the aforementioned polymeric compositions one can, by means of spinning, stretching and, when necessary, annealing, obtain filaments containing the two linear polymers as separate phases, both in the oriented state. The filaments thus obtained present, insofar as their absorbing properties are concerned, properties intermediate between those of the two pure polymers.

For the preparation of textile fibres the polymeric compositions are preferably prepared from one component made of a linear-alpha-olefin polymer consisting primarily of isotactic macromolecules, and from a second component of a polymer having such regularity of steric structure as to be crystallizable.

More particularly, the first component may consist of isotactic polymers or of polymers prevailingly consisting of isotactic macromolecules, these polymers obtained from monomers of propylene, styrene, or 4-methyl pentene-1.

Acrylic polymers having regular structure, such as isopropyl or tertiary butyl acrylates may be used as the second component. In addition, polymers having isotactic or syndiotactic structure, these polymers made from monomers of alkyl methacrylates, may also be used as the second component. Finally, such second component may be a polymer obtained from a monomer of the type $$R_1\text{—}O\text{—}CH\text{=}CHR_2$$

where $R_1$ and $R_2$ are alkyl, this polymer having a di-isotactic structure.

Textile fibres presenting very good mechanical properties have been obtained by using polymeric compositions in which the second component consists of isotactic or di-isotactic crystalline polymers having a melting point not very different from that of the first component polyolefin used for preparing the fibers.

Solidification of the two polymers takes place at slightly different temperatures; thus the orientation by stretching can take place for both types of macromolecules at the same stretching temperature.

The fibres thus obtained, containing both types of macromolecules in the oriented state, generally exhibit better mechanical properties than fibres obtained by spinning together a crystalline and an amorphous substance. Nevertheless, the filament remarkably acquires certain specific properties of the added macromolecules (i.e. the second component) even if these are present in relatively low amounts. More particularly, fibres thus obtained by co-spinning exhibit dye-absorbing properties of the second component polymer which has been added to improve the dyeability. In general, the second component may consist of any high molecular weight linear polymers with sterically regular structure, which polymers contain at least one oxygen atom and are soluble in the molten first component polymer. The second component polymer is preferably present in an amount between 2% and 30%, preferably between 2% and 10%, by weight.

Macromolecules of the second component exhibit a stronger hindrance toward crystallization. However, this is not a disadvantage and, in fact, in certain instances is advantageous, for the amorphous polymer portions are more easily dyeable, while a very limited crystallization is sufficient to assure adequate resistance against solvents and detergents. For instance, when the first component is isotatic polypropylene and the second component is an isotatic polymer of a monomer containing oxygen, such as tertiary butyl acrylate or isopropyl acrylate, such polymers obtained e.g., by polymerization in the presence of catalysts of the type

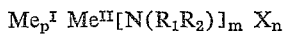

or etherates thereof (where $R_1$ and $R_2$ are alkyl, cycloalkyl, aryl or alkylaryl groups or together with the nitrogen form a heterocyclic ring, $Me^I$ is an alkaline metal, $Me^{II}$ is a metal belonging to the 1st, 2nd or 3rd group of the Periodic Table, X is hydrogen or a halogen, $p$ is zero or a portion integer, $m+n$ is the sum of the valences of $Me^I$ and $Me^{II}$) whereby satisfactory spinning of the macromolecules and good dyeing of the resulting fibres may be obtained.

Di-isotactic polymers such as e.g. (threo-diisotactic) crystalline poly-1-methyl-2-isobutoxyethylene, presenting a melting point near that of polypropylene, may also be employed as the second component.

The addition of the second component polymer considerably improves the properties of the fibre insofar as its dyeability is concerned, particularly when using dyes normally used for the dyeing of cellulose acetate fibres. Fibres obtained by co-spinning isotactic polypropylene with isotactic tertiary butyl polyacrylate have improved adsorbing properties for basic dyes if they are subjected, prior to dyeing, to partial saponification by treatment with a basic substance (such as a sodium hydroxide solution), followed by washing with an acid.

In general, relatively small amounts of polyvinylpyridine e.g. from 2% to 25%, preferably above 5%, in the mixture are sufficient to produce fibres having good dyereceptivity.

Similar results are obtained using poly-4-vinyl-pyridine as the second component. As compared to poly-2-vinylpyridine, poly-4-vinylpyridine presents a slightly higher softening point.

The mechanical properties of the fibres obtained from mixtures of isotactic polymers of a monomer containing oxygen and polypropylene depend mainly on the characteristics (molecular weight and crystallinity) of the particular polypropylene used, i.e. the presence of the oxygen conaining polymer has little or no substantial effect on such properties. For example, when the spinning composition consists solely of polypropylene containing about 95% isotactic macromolecules not extractable with boiling n-heptane and having an intrinsic viscosity of between 1 and 1.5, fibres are obained having a tenacity of about 5 g./den. and an elongation at break of 20 to 25%. However, when a mixture of the above polypropylene with 10% poly-isopropylacrylate is spun and stretched to form fibres in the same manner as done on the above polypropylene alone, the resulting fibres exhibit virtually the same tenacity and elongation at break as did the polyproylene fibres.

Another important characteristic of our fibres, either before or even after dyeing, is their high resistance to solvents and to the action of detergents containing surface-active agents. This behavior is virtually the same as that exhibited by a fibre consisting solely of polypropylene. Thus, fibres obtained according to our invention are strikingly differentiated from those fibres heretofore obtained by adding amorphous polymers to polypropylene, e.g., such amorphous polymers as amorphous poly-isopropylacrylate obtained by use of conventional non-stereospecific polymerization processes.

A further advantage resides in the resistance of our fibres to ironing. This resistance is equivalent to that of consisting solely of polyethylene. This is in distinct contrast to the lower resistance generally obtained when fusible low molecular weight organic amorphous substances are added to polypropylene during spinning. In this latter instance, a decrease in the melting point of the fibre occurs, resulting in lower resistance to deformation at temperatures higher than 100° C. and in considerable impairment of the dimensional stability of the fibre, even at the temperature of boiling water.

Dyeing of fibres containing polyisopropylacrylate or poly tert. butylacrylate is preferably carried out with the use of basic dyes.

Since polypropylene is not wetted by water, surface-active substances having an affinity for dyes and possibly also for basic substances are desirably added to the dyeing bath.

The addition of substances having a swelling action or of substances which react in a reversible manner with the polyvinylpyridine is also convenient.

The following examples will further illustrate our invention. All parts are by weight unless otherwise indicated.

*Example 1*

A polymeric composition containing 10% isotactic polyisopropyl acrylate, highly crystalline by X-ray examination (obtained as described in our application Serial No. 39,219, filed June 28, 1960), and 90% polypropylene with 90% of isotactic macromolecules (obtained as described in Italian Patent No. 537,425), was spun at 220° C. under a pressure of from 10–15 kg./cm.². The fibre obtained was dyeable with dispersed acetate dyes such as e.g. Cibacet Scarlet BR (C.I. Dispersed Red 18) and Setyl Violet B (C.I. 62030).

*Example 2*

A yarn obtained by the procedure described in Example 1 was subjected to a saponification treatment for several hours with a boiling 20% alcoholic solution of potassium hydroxide. After this treatment the yarn was found to be dyeable with basic dyes such as e.g. basic Fuchsin (C.I. 422510 B) and Astrazon Blue G (C.I. 42025).

*Example 3*

A polymeric composition containing 90% polypropylene (containing 90% isotactic macromolecules) and 10% crystalline poly-1-methyl-2-isobutoxy ethylene (obtained as described in our application Serial No. 859,041, filed December 11, 1959), was spun at 230° C. under a pressure of from 5–10 kg./cm.². The yarn thus obtained was dyeable with dispersed acetate dyes.

Variations can, of course, be made without departing from the spirit of our invention.

Having thus described our invention, what we desire to secure and claim by Letters Patent is:

1. A polymeric composition comprising (1) a linear crystallizable poly-alpha-olefin selected from the group consisting of polypropylene, poly-4-methyl-pentene-1, and polystyrene and (2) a linear polymer selected from the group consisting of polytertiarybutylacrylate, polyisopropylacrylate, polytertiarybutylmethacrylate, polyisopropylmethacrylate, and a polymer of a monomer of the formula $R_1-O-CH=CHR_2$ wherein $R_1$ and $R_2$ are selected from the group consisting of methyl and isobutyl.

2. The polymeric composition of claim 1 wherein said linear polymer contains macromolecules having isotactic structure.

3. The polymeric composition of claim 1 wherein said linear polymer contains marcromolecules having di-isotactic structure.

4. The polymeric composition of claim 1 wherein said linear polymer contains macromolecules having syndiotactic structure.

5. The polymeric composition of claim 1 wherein the linear polymer is a crystallizable poly-isopropyl-acrylate.

6. The polymeric composition of claim 1 wherein said linear polymer is a crystallizable poly-tertiary butyl acrylate.

7. The polymeric composition of claim 3 wherein said linear polymer is a crystallizable polymer of the trans-isomer of a monomer having the formula $$R_1-O-CH=CHR_2$$

where $R_1$ and $R_2$ are selected from the group consisting of methyl and isobutyl.

8. The polymeric composition of claim 7 wherein $R_1$ is isobutyl and $R_2$ is methyl.

9. The polymeric composition of claim 1 wherein said poly-alpha-olefin is a propylene polymer consisting substantially of isotactic macromolecules.

10. The polymeric composition of claim 1 wherein said poly-alpha-olefin is poly-4-methyl-pentene-1 and consists substantially of isotactic macromolecules.

11. The polymeric composition of claim 1 wherein said poly-alpha-olefin is polystyrene and consists substantially of isotactic macromolecules.

12. Said polymeric composition of claim 1 wherein the linear polymer is present in an amount from 2% to 30%, preferably from 2% to 10%, by weight.

13. A textile fibre obtained by spinning and stretching the polymeric composition of claim 1.

14. A textile fibre obtained from the polymeric composition of claim 1 wherein said linear polymer presents a melting point near that of said poly-alpha-olefin.

15. A fibre dyeable with acetate dyes, this fibre obtained from the polymeric composition of claim 1.

16. A fibre obtained from the polymeric composition of claim 1 in which the affinity to basic dyes is increased by partial saponification of the ester groups contained in the fibre before dyeing.

17. A textile fibre obtained from the polymeric composition of claim 1 wherein said linear polymer is present in an amount from 2% to 30%, preferably from 2% to 10%, by weight.

18. The polymeric composition of claim 1 wherein said linear polymer is polytertiarybutylacrylate.

19. The polymeric composition of claim 1 wherein said linear polymer is polyisopropylacrylate.

References Cited in the file of this patent

UNITED STATES PATENTS

| | | |
|---|---|---|
| 2,882,263 | Natta et al. | Apr. 14, 1959 |
| 2,888,424 | Precopio et al. | May 26, 1959 |
| 2,910,461 | Nowlin | Oct. 27, 1959 |

FOREIGN PATENTS

| | | |
|---|---|---|
| 205,452 | Austria | Mar. 15, 1959 |

OTHER REFERENCES

Chemical and Engineering News article, Aug. 11, 1958, pages 51, 52 and 56.